United States Patent
Schatvet (10) Patent No.: US 8,294,784 B2
(45) Date of Patent: Oct. 23, 2012

(54) METHOD, APPARATUS, AND COMPUTER-READABLE STORAGE MEDIUM FOR REMOVING FLICKERING IN VIDEO IMAGES OF OBJECTS ILLUMINATED BY AMBIENT LIGHTING AND SCREEN LIGHT

(75) Inventor: Petter Schatvet, Sandvika (NO)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 12/976,569

(22) Filed: Dec. 22, 2010

(65) Prior Publication Data

US 2011/0205393 A1 Aug. 25, 2011

Related U.S. Application Data

(60) Provisional application No. 61/291,617, filed on Dec. 31, 2009.

(30) Foreign Application Priority Data

Dec. 23, 2009 (NO) .................................. 20093588

(51) Int. Cl.
*H04N 9/73* (2006.01)
*H04N 9/01* (2006.01)

(52) U.S. Cl. ..................................... 348/226.1; 348/447

(58) Field of Classification Search ............... 348/226.1, 348/447, 910
See application file for complete search history.

(56) References Cited

U.S. PATENT DOCUMENTS

| 5,272,539 | A | * | 12/1993 | Kondo | 348/229.1 |
|---|---|---|---|---|---|
| 5,293,238 | A | | 3/1994 | Nakano et al. | |
| 5,929,909 | A | | 7/1999 | Hoelzemann et al. | |
| 5,960,153 | A | | 9/1999 | Oster et al. | |
| 6,658,203 | B1 | | 12/2003 | Oster et al. | |
| 6,999,118 | B2 | * | 2/2006 | Suzuki | 348/226.1 |
| 7,034,870 | B2 | * | 4/2006 | Nagaoka et al. | 348/228.1 |
| 7,187,405 | B2 | * | 3/2007 | Poplin et al. | 348/226.1 |
| 7,248,289 | B2 | * | 7/2007 | Katoh et al. | 348/228.1 |
| 7,289,144 | B2 | * | 10/2007 | Arazaki | 348/228.1 |
| 7,502,054 | B2 | * | 3/2009 | Kalapathy et al. | 348/226.1 |
| 7,538,799 | B2 | * | 5/2009 | Yanof | 348/226.1 |

(Continued)

FOREIGN PATENT DOCUMENTS

DK 96 00320 U4 2/1998

(Continued)

OTHER PUBLICATIONS

Norwegian Search Report issued Jul. 13, 2010, in Norway Patent Application No. 20093588, filed Dec. 23, 2009.

(Continued)

*Primary Examiner* — John Villecco
*Assistant Examiner* — Selam Gebriel
(74) *Attorney, Agent, or Firm* — Oblon, Spivak, McClelland, Maier & Neustadt, L.L.P.

(57) ABSTRACT

A method, apparatus, and computer-readable storage medium for removing flickering from a video of an object illuminated by a screen that operates on a refresh rate value ($f_{scr}$) among a first value set including screen compatible refresh rate values, and an ambient lighting that operates on a certain line frequency value ($f_l$) captured by a camera with a certain exposure time value ($t_e$) among a second value set including camera compatible exposure time values.

20 Claims, 4 Drawing Sheets

U.S. PATENT DOCUMENTS

| | | | |
|---|---|---|---|
| 2004/0080630 A1* | 4/2004 | Kim | 348/226.1 |
| 2005/0225649 A1* | 10/2005 | Shinotsuka | 348/226.1 |
| 2007/0085912 A1* | 4/2007 | Hakola et al. | 348/227.1 |
| 2007/0153094 A1 | 7/2007 | Noyes et al. | |
| 2008/0309791 A1* | 12/2008 | Nishiwaki et al. | 348/226.1 |
| 2009/0128660 A1* | 5/2009 | Dai et al. | 348/228.1 |
| 2009/0128683 A1 | 5/2009 | Matsumoto | |
| 2009/0147103 A1* | 6/2009 | Chao | 348/226.1 |

FOREIGN PATENT DOCUMENTS

| | | |
|---|---|---|
| EP | 0 771 106 A2 | 5/1997 |
| EP | 0 971 534 | 1/2000 |
| WO | WO 00/07362 | 2/2000 |
| WO | WO 2006/029394 | 3/2006 |

OTHER PUBLICATIONS

International Type Search Report issued May 12, 2010, in Norway Patent Application No. 20093588, filed Dec. 23, 2009.

International Search Report and Written Opinion issued Mar. 14, 2011 in Application No. PCT/NO2010/000448.

* cited by examiner

METHOD, APPARATUS, AND COMPUTER-READABLE STORAGE MEDIUM FOR REMOVING FLICKERING IN VIDEO IMAGES OF OBJECTS ILLUMINATED BY AMBIENT LIGHTING AND SCREEN LIGHT

CROSS-REFERENCE TO RELATED APPLICATIONS

The present application claims the benefit under 35 U.S.C. §119 from U.S. Provisional Application No. 61/291,617, filed Dec. 31, 2009, and claims priority to Norwegian Patent Application No. 20093588, filed Dec. 23, 2009, which are both herein incorporated by reference in their entirety.

BACKGROUND

1. Technological Field

The present disclosure relates to a method, apparatus, and computer-readable storage medium that remove flickering in video images of objects illuminated by ambient lighting and screen light.

2. Description of the Related Art

In order to have a meeting involving participants not located in the same area, a number of technological systems are available. These systems may include video conferencing, web conferencing, and audio conferencing.

A realistic substitute for real meetings is high-end video conferencing systems. Conventional video conferencing systems comprise a number of endpoints communicating real-time video, audio, and/or data streams over WAN, LAN, and/or circuit switched networks. The endpoints include one or more monitors, cameras, microphones, and/or data capture devices and a codec, which encodes and decodes outgoing and incoming streams, respectively.

Video conference systems are used throughout the business community for point to point audio and visual communication between individuals. The users of video conferencing systems may sit in workplace environments such as a personal office or a cubical, small or large meeting rooms, board rooms, or the like. Video conference applications installed on multi purpose computers have contributed to spreading the use of personal video conferencing even more.

Figure 1:
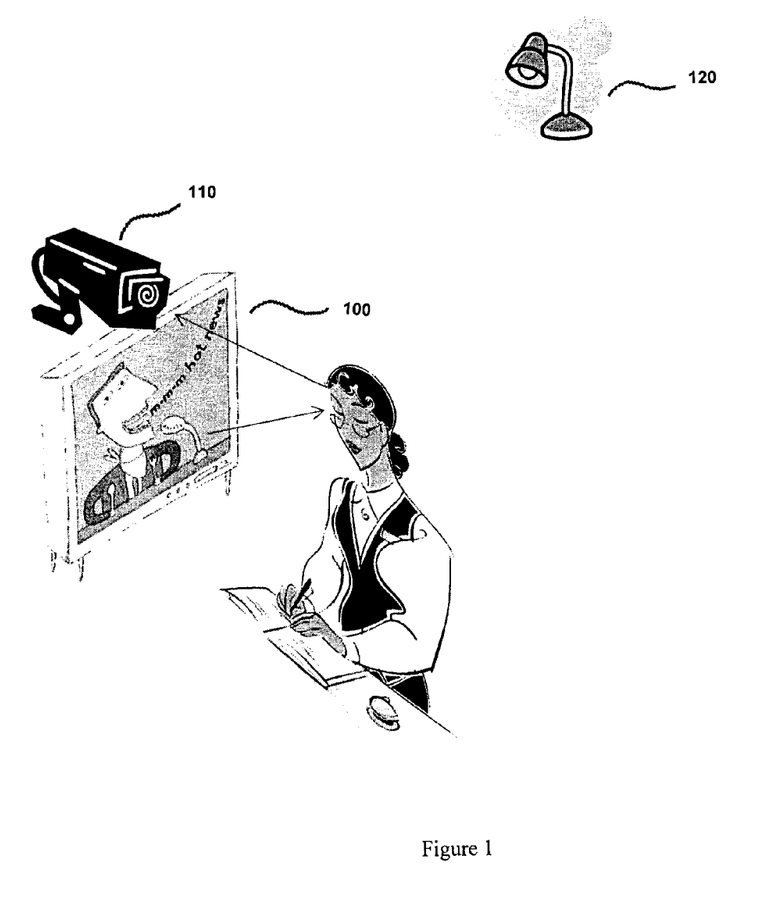
FIG. 1 shows a situation where an object captured by a camera is illuminated both by a screen and ambient lighting.

FIG. 1 illustrates a situation in which an object (i.e., a person) captured by a camera sits close to the display screen 100. As screens become bigger and brighter, the screen 100 will illuminate the object which can lead to artifacts such as color and intensity variations on objects. The artifacts can visually manifest themselves in flickering or color variations that are modulated by the contents seen on the screen.

The flickering is caused by the exposure time (i.e., integration time) of the camera 110 to record each individual frame in a video picture, combined with the frequencies of the ambient lighting 120 and the refresh rate/frequency of the screen 100 illuminating objects captured by the camera 110. A screen 100 contains thousands of illuminative pixels in array. Visual content is displayed by successively applying voltage on each pixel in a pixel line from left to right for each line from the top of the screen 100 and downwards. The refresh rate of the screen 100 is therefore the frequency of illuminating the pixels in the whole screen 100 from top left to bottom right.

Depending on the refresh rate of the screen 100 in question, the refresh rate of the screen 100 may cause its own flickering even if the camera 110 is optimized for the normal ambient environment. Furthermore, with the advent of larger and high intensity emissive displays, indirect illumination caused by such emitters may cause flickering in all or portions of the image seen by the camera 110.

It may be desirable for the integration time to be as long as possible i.e., maximally responding to the frame rate (1/framerate) to maximize signal to noise (S/N) ratio in a resulting footage. However, due to line frequency of 50 Hz (60 Hz in the United States, 400 Hz in airplanes, for example), lamps operating at mains Alternating Current (AC) exhibit intensity variations at double the line frequency. To avoid flickering (i.e., phantom intensity variations over time, which may look like flickering or line rolling), an approach is to select an appropriate integration time for the environment with the aim of overcoming the problem during capture. The relationship that ensures cameras do not beat against a global cyclical stimuli f is:

Integration time=$n/(2f)$, where $n=0, 1, 2, \ldots$

The result of adjusting the integration time according to this equation is that the camera 110 will capture integer numbers of half light wavelengths, thereby avoiding variations of light intensity among captured frames.

As already mentioned, flickering is not only caused by ambient light. In situations when captured objects are positioned close to relatively big screens, as discussed above, the illumination contribution from the screen 100 may be considerable, and if the integration time is adapted to ambient light only, flickering may occur due to the refresh rate of the screen 100.

Figure 2:
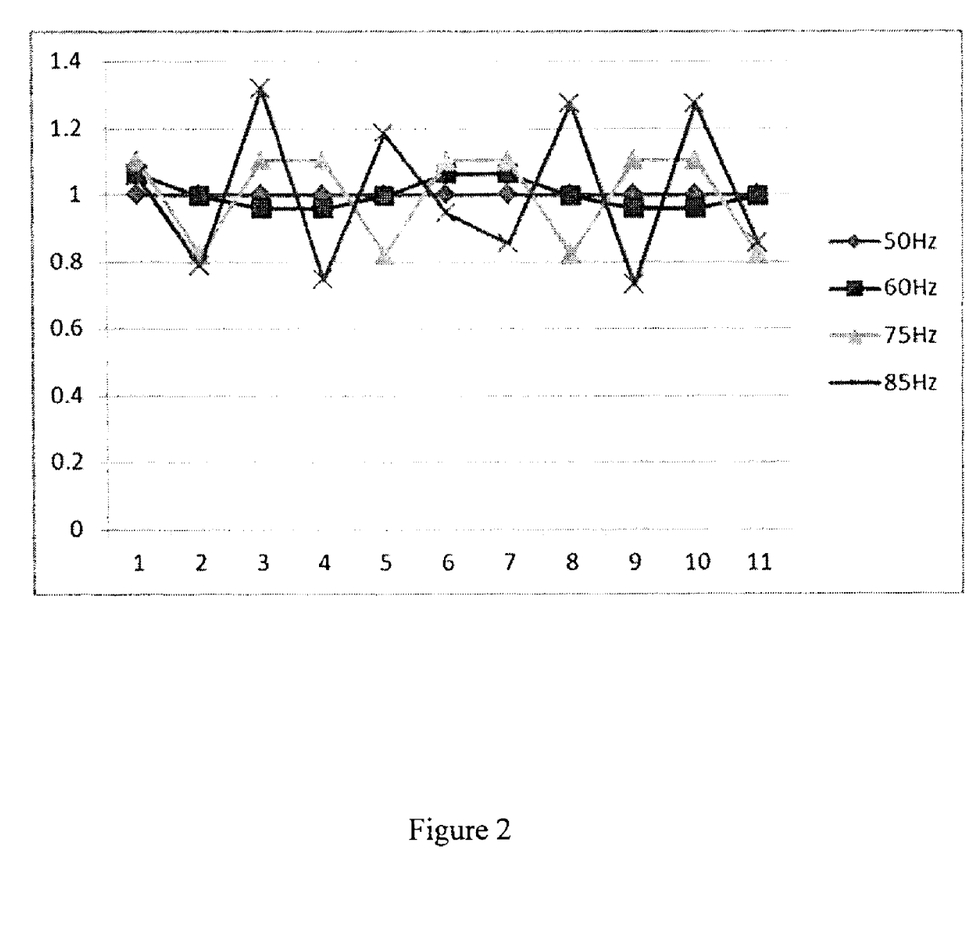
FIG. 2 is a graph illustrating intensity variations of light captured by a camera caused by various common screen update rates.

FIG. 2 is a graph that shows the effect of a scene optimized for 50 Hz ambient at 10 ms integration time, with the intensity variations of various common screen refresh rates/frequencies when lit 100% by single sinusoidal intensity source. In FIG. 2, the X-axis represents complete 10 ms integration windows. As can be seen in FIG. 2, the intensity variations increase as the refresh rate moves away from 50 Hz. This is experienced as flickering by viewers watching the video images captured by the camera 110.

SUMMARY

A method, device, and computer-readable storage medium for removing flickering from a video of an object illuminated by a screen that operates on a refresh rate value ($f_{scr}$) among a first value set including screen compatible refresh rate values, and an ambient lighting that operates on a certain line frequency value ($f_l$) captured by a camera with a certain exposure time value ($t_e$) among a second value set including camera compatible exposure time values. The method includes first determining whether a non-zero integer number n exists so that $t_e = n/2f_l$; second determining, when the non-zero integer number n exists, whether non-zero integer numbers for k and l exist so that $kf_{scr} = lf_l$; calculating, when the non-zero integer numbers for k and l do not exist, a third value set including values for $f_{scr}$ fulfilling $kf_{scr} = lf_l$, where k and l are non-zero integer numbers, and determining whether one or more values in the third value set is equal to one or more values in the first value set; and assigning, when the one or more values in the third value set is equal to one or more values in the first value set, $f_{scr}$ to one of the one or more values in the third value set that is equal to one or more values in the first value set, and implementing $t_e$ as the exposure time of the camera and $f_{scr}$ as the refresh rate of the screen.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

According to an embodiment of the present disclosure, the distractive illuminative flickering due to discrepancy between line frequency, screen updating rate, and camera exposure time, for example, in video conferencing and video recording is removed by a method of adjusting the screen updating rate and the camera exposure time to achieve a flickering free experience of the video captured by the camera.

Furthermore, according to an embodiment of the present disclosure, a computer-readable storage medium may cause a computer to perform the aforementioned method of adjusting the screen updating rate and the camera exposure time to achieve a flickering free experience of video captured by a camera.

In addition, according to an embodiment of the present disclosure, the distractive illuminative flickering due to discrepancy between line frequency, screen updating rate, and camera exposure time, for example, in video conferencing and video recording is removed by an apparatus which adjusts the screen updating rate and the camera exposure time to achieve a flickering free experience of the video captured by the camera. The apparatus may be a video conference terminal, a video recording device, or the like.

It is assumed that both the screen refresh rate and camera exposure time at least to a certain extent are adjustable from data routines through driving devices of the screen 100 and the camera 110, respectively. This is generally the case in videoconferencing between general purpose computers having a software videoconferencing client installed, and a camera 110 either plugged into a Universal Serial Bus (USB) port or integrated in the computer's screen 100. It could likewise also be the situation for video recording units, when the recorded objects are positioned close to a screen 100.

Web cameras 110, for example, may have Application Programming Interfaces (APIs) enabling interaction with other software, much in the same way that a user interface facilitates interaction between humans and computers. This also applies for both external and internal screens. For example, by entering into the Control Panel of a Microsoft Windows® operating system, a user can manually select the refresh rate of the screen or the exposure time of the camera, normally between fixed compatible values. Likewise, through an API associated with the screen or the camera, a software routine may make the same selection by directing certain requests or instructions interpretable for the APIs.

The line frequency of the ambient lighting is predefined, but has a substantial impact on the selection of screen refresh rate and camera exposure time according to the present disclosure. However, the line frequency of the ambient lighting may vary between countries, regions, and settings, and thus should be measured by the camera 110, for example, before the actual selection occurs. A method of optical measurement of line frequency is known in the art, for example, as described in U.S. Pat. No. 5,394,217, "Method and apparatus for determining line frequency and detecting variable frequency light sources," to Gaboury et al. Alternatively, the line frequency may also be measured directly from the power line input of the video conferencing device, or may be predefined.

Figure 3:
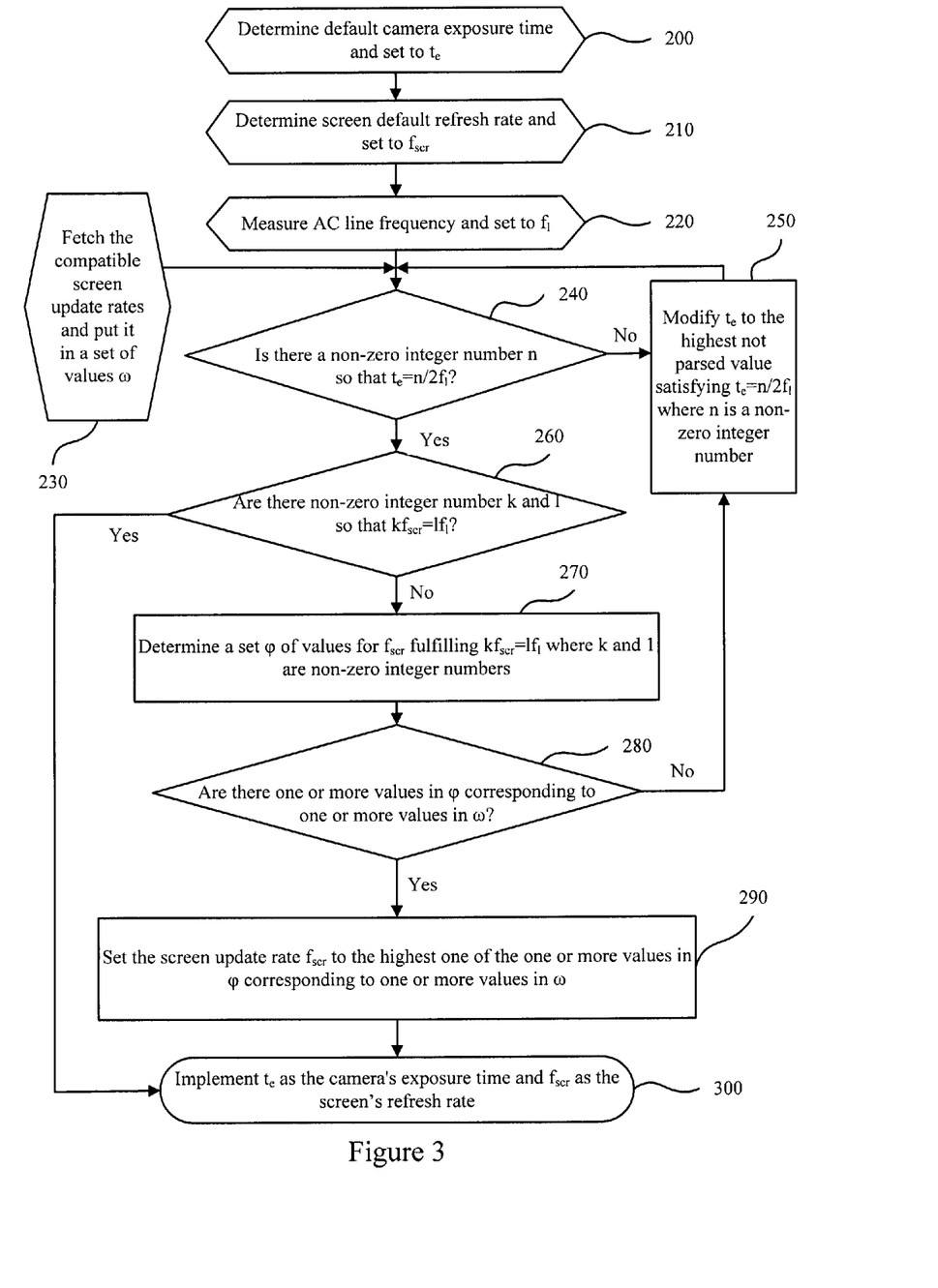
FIG. 3 shows an exemplary embodiment of a method according to the present disclosure.

FIG. 3 is a flow chart illustrating an example of a process of reaching a flickering free video experience wherein a camera 110 captures objects that are at least partly illuminated by light from a screen 100, where the display is being line wised refreshed with a certain screen refresh rate.

The example of FIG. 3 may start with preparation steps 200 to 230. The camera exposure time may be set to a default time, and the screen refresh rate may be set to a default rate. The aforementioned default values are captured and allocated, in steps 200 and 210, to $t_e$ and $f_{scr}$, respectively, so that the default values become the selected values, if the values, in combination with the line frequency, provide flickering free video captured by the camera 110 without any modifications. The line frequency may not be known and, thus, may be measured, for example, optically by the camera 110, before being assigning to $f_l$, as noted in step 220. As noted above, screens may be compatible with limited numbers of allowed refresh rates. Thus, in step 230, the compatible screen refresh rates are captured from the driver unit of the screen 100 and placed in a set of possible refresh rate values ω.

In decision step 240, it is determined whether the flickering free equation $t_e=n/2f_l$, where n is a non-zero integer number, has a solution with the current value for $t_e$ (i.e., the default camera exposure time determined in step 200). If there is no solution (i.e., a non-zero integer number n does not exist) (No, at step 240), the process proceeds to step 250, where $t_e$ is changed to an alternative value which is not tested in the process before. In step 250, $t_e$ is modified to the highest not parsed value satisfying $t_e=n/2f_l$, where n is a non-zero integer number. The selected value for $t_e$ may be as high as possible, for example. However, the selection may also be based on other considerations, provided that a potential exposure time that has not been tested earlier in the process is selected.

As shown in FIG. 3, the process is then looped back from step 250 to decision step 240.

If, in decision step 240, it appears that $t_e=n/2f_l$ has a solution (i.e., a non-zero integer number n does exist) (Yes, at step 240), decision step 260 then determines whether there is one or more solutions of the equation $kf_{scr}=lf_l$, where k and l are non-zero integer numbers with current $f_{scr}$ (i.e., the default screen refresh rate determined in step 210). This test reveals if a least common multiple of $1/f_{scr}$ and $1/f_l$ exists. If a least common multiple exists, it may be deducted that the general flickering free equation Integration time=$n/2f$, where $n=1, 2, 3, \ldots$ has a solution for both $f_{scr}$ and $f_l$, and there will be no flickering contribution either from the screen 110 or the ambient light 120 with the corresponding exposure time (integration time).

If decision step 260 is positive (Yes, at step 260), the process is terminated, and current $f_{scr}$ and $t_e$ are selected to be the screen refresh rate and camera exposure time, respectively. If the values are not equal to the default values, the values are modified in the associated driver units, for example, by sending a request to the associated API for changing to the selected value(s).

If decision step 260 is negative (No, at step 260), the process proceeds to step 270 where a set (φ) of possible values for $f_{scr}$ fulfilling the equation $kf_{scr}=lf_l$, where k and l are non-zero integer numbers, is determined. The process then proceeds to decision step 280 which determines whether there are one or more values in set φ corresponding to one or more values of compatible screen refresh rates (ω) already fetched in preparation step 230. If there are no corresponding values (No, at step 280), the process turns back to step 250 to select an alternative exposure time ($t_e$). However, if it appears that φ and ω have common values, the process proceeds to step 290, where the highest common value of the sets φ and ω is allocated as $f_{scr}$. In this example, the highest value is selected assuming that a highest possible screen refresh rate is preferred. Alternatively, in another embodiment, the aforementioned selection may also be based on other considerations. The basic goal is to reach a value being present in both sets of values.

Next, the process is terminated at step 300, where current $f_{scr}$ and $t_e$ are selected to be the screen refresh rate and camera exposure time, respectively. The aforementioned values are then modified in the associated driver units, for example, by sending a request to the associated API for changing to the selected value(s).

Figure 4:
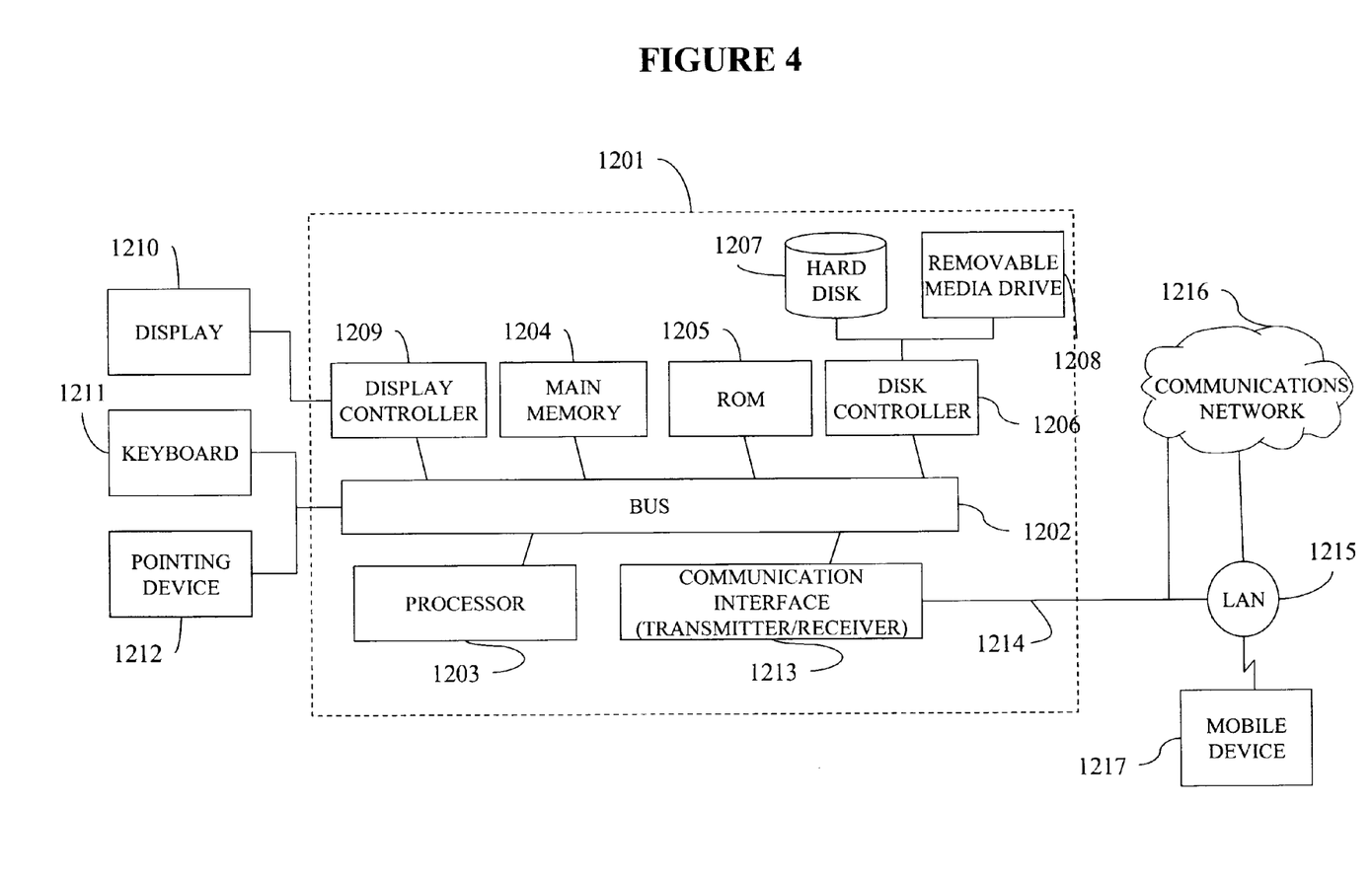
FIG. 4 illustrates a computer system upon which an embodiment of the present disclosure may be implemented.

FIG. 4 illustrates a computer system 1201 upon which an embodiment of the present disclosure may be implemented. The computer system 1201, for example, may include various components of an apparatus (i.e., a video conferencing device, a video recording device, or the like), which may also include a flicker processing unit, or the like, configured to perform various processes (i.e., the processes of FIG. 3). The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the screen 100, for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure (for example, the steps of FIG. 3), in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A method for removing flickering from a video of an object illuminated by a screen that operates on a refresh rate value ($f_{scr}$) among a first value set including screen compatible refresh rate values, and an ambient lighting that operates on a certain line frequency value ($f_l$) captured by a camera with a certain exposure time value ($t_e$) among a second value set including camera compatible exposure time values, the method comprising:
   first determining whether a non-zero integer number n exists so that $t_e=n/2f_l$;
   second determining, when the non-zero integer number n exists, whether non-zero integer numbers for k and l exist so that $kf_{scr}=lf_l$;
   calculating, when the non-zero integer numbers for k and l do not exist, a third value set including values for $f_{scr}$ fulfilling $kf_{scr}=lf_l$, where k and l are non-zero integer numbers, and determining whether one or more values in the third value set is equal to one or more values in the first value set; and
   assigning, when the one or more values in the third value set is equal to one or more values in the first value set, $f_{scr}$ to one of the one or more values in the third value set that is equal to one or more values in the first value set, and implementing $t_e$ as the exposure time of the camera and $f_{scr}$ as the refresh rate of the screen.

2. The method according to claim 1, further comprising:
   removing, when the non-zero integer number n does not exist, the value of $t_e$ from the second value set, assigning $t_e$ to a second value in the second value set fulfilling $t_e=n/2f_l$, and determining whether the non-zero integer number n exists so that $t_e=n/2f_l$, where $t_e$ is the second value.

3. The method according to claim 1, further comprising:
   removing, when the one or more values in the third value set is not equal to one or more values in the first value set, the value of $t_e$ from the second value set, assigning $t_e$ to a second value in the second value set fulfilling $t_e=n/2f_l$, and determining whether the non-zero integer number n exists so that $t_e=n/2f_l$, where $t_e$ is the second value.

4. The method according to claim 1, further comprising:
   implementing $t_e$ as the exposure time of the camera and $f_{scr}$ as the refresh rate of the screen, when the non-zero integer numbers for k and l exist.

5. The method according to claim 1, further comprising:
   optically measuring, before the first determining, the line frequency from the camera captured lighting, and assigning the measured line frequency to $f_l$.

6. The method according to claim 1, further comprising:
   fetching, before the first determining, a default screen refresh rate value from a screen driver device, and assigning the default screen refresh rate value to $f_{scr}$.

7. The method according to claim 1, further comprising:
   fetching, before the first determining, a default exposure time value from a camera driver device, and assigning the default exposure time value to $t_e$.

8. The method according to claim 1, further comprising:
   instructing a camera driver device associated Application Programming Interface (API) to set the exposure time of the camera to $t_e$; and
   instructing a screen driver device associated Application Programming Interface (API) to set the refresh rate of the screen to $f_{scr}$.

9. The method according to claim 2, wherein the second value in the second value set fulfilling $t_e=n/2f_l$ is a highest value in the second value set.

10. The method according to claim 1, further comprising:
    assigning $f_{scr}$ to a highest one of the one or more values in the third set that is equal to one or more values in the first value set.

11. An apparatus comprising:
a camera;
a screen configured to operate on a refresh rate value ($f_{scr}$) among a first value set including screen compatible refresh rate values, the camera capturing video images with a certain exposure time value ($t_e$) among a second value set including camera compatible exposure time values of objects illuminated by the screen and an ambient lighting operating on a certain line frequency value ($f_l$); and
a flicker processing unit configured to,
first determine whether a non-zero integer number n exists so that $t_e=n/2f_l$,
second determine, when the non-zero integer number n exists, whether non-zero integer numbers for k and l exist so that $kf_{scr}=lf_l$,
calculate, when the non-zero integer numbers for k and l do not exist, a third value set including values for $f_{scr}$ fulfilling $kf_{scr}=lf_l$, where k and l are non-zero integer numbers, and determine whether one or more values in the third value set is equal to one or more values in the first value set, and
assign, when the one or more values in the third value set is equal to one or more values in the first value set, $f_{scr}$ to one of the one or more values in the third value set that is equal to one or more values in the first value set, and implement $t_e$ as the exposure time of the camera and $f_{scr}$ as the refresh rate of the screen.

12. The apparatus according to claim 11, wherein the flicker processing unit is further configured to remove, when the non-zero integer number n does not exist, the value of $t_e$ from the second value set, assign $t_e$ to a second value in the second value set fulfilling $t_e=n/2f_l$, and determine whether the non-zero integer number n exists so that $t_e=n/2f_l$, where $t_e$ is the second value.

13. The apparatus according to claim 11, wherein the flicker processing unit is further configured to remove, when the one or more values in the third value set is not equal to one or more values in the first value set, the value of $t_e$ from the second value set, assign $t_e$ to a second value in the second value set fulfilling $t_e=n/2f_l$, and determine whether the non-zero integer number n exists so that $t_e=n/2f_l$, where $t_e$ is the second value.

14. The apparatus according to claim 11, wherein the flicker processing unit is further configured to implement $t_e$ as the exposure time of the camera and $f_{scr}$ as the refresh rate of the screen, when the non-zero integer numbers for k and l exist.

15. The apparatus according to claim 11, wherein the flicker processing unit is further configured to fetch, before the flicker processing unit first determines whether the non-zero integer number n exists, a default screen refresh rate value from a screen driver device, and assign the default screen refresh rate value to $f_{scr}$.

16. The apparatus according to claim 11, wherein the flicker processing unit is further configured to fetch, before the flicker processing unit first determines whether the non-zero integer number n exists, a default exposure time value from a camera driver device, and assign the default exposure time value to $t_e$.

17. The apparatus according to claim 11, wherein the flicker processing unit is further configured to instruct a camera driver device associated Application Programming Interface (API) to set the exposure time of the camera to $t_e$, and instruct a screen driver device associated Application Programming Interface (API) to set the refresh rate of the screen to $f_{scr}$.

18. The apparatus according to claim 12, wherein the second value in the second value set fulfilling $t_e=n/2f_l$ is a highest value in the second value set.

19. The apparatus according to claim 11, wherein the flicker processing unit is further configured to assign $f_{scr}$ to a highest one of the one or more values in the third set that is equal to one or more values in the first value set.

20. A computer-readable storage medium including computer executable instructions, wherein the instructions, when executed by a computer, cause the computer to perform a method for removing flickering from a video of an object illuminated by a screen that operates on a refresh rate value ($f_{scr}$ among a first value set including screen compatible refresh rate values, and an ambient lighting that operates on a certain line frequency value ($f_l$) captured by a camera with a certain exposure time value ($t_e$) among a second value set including camera compatible exposure time values, the method comprising:
first determining whether a non-zero integer number n exists so that $t_e=n/2f_l$;
second determining, when the non-zero integer number n exists, whether non-zero integer numbers for k and l exist so that $kf_{scr}=lf_l$;
calculating, when the non-zero integer numbers for k and l do not exist, a third value set including values for $f_{scr}$ fulfilling $kf_{scr}=lf_l$, where k and l are non-zero integer numbers, and determining whether one or more values in the third value set is equal to one or more values in the first value set; and
assigning, when the one or more values in the third value set is equal to one or more values in the first value set, $f_{scr}$ to one of the one or more values in the third value set that is equal to one or more values in the first value set, and implementing $t_e$ as the exposure time of the camera and $f_{scr}$ as the refresh rate of the screen.

* * * * *